UNITED STATES PATENT OFFICE.

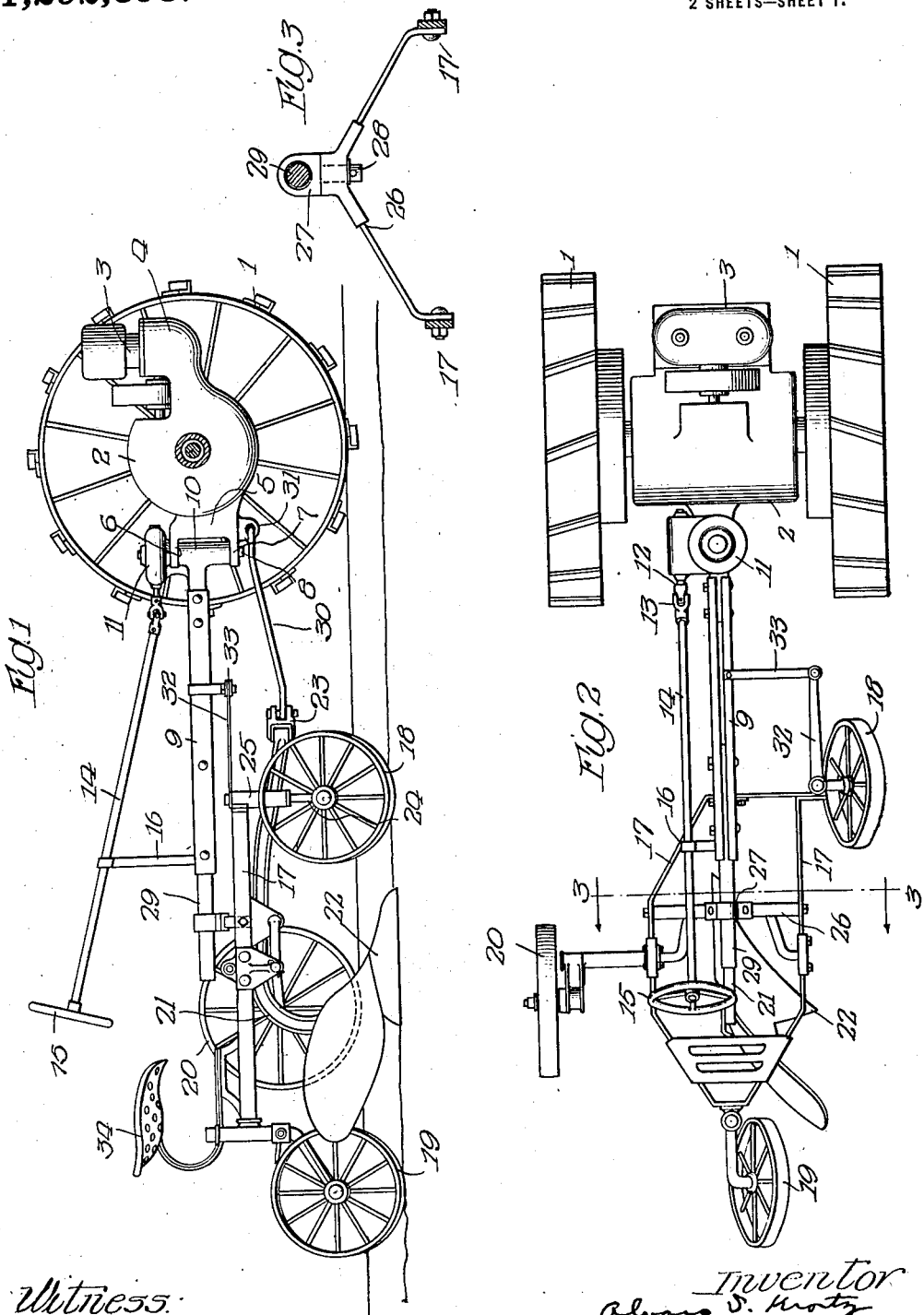

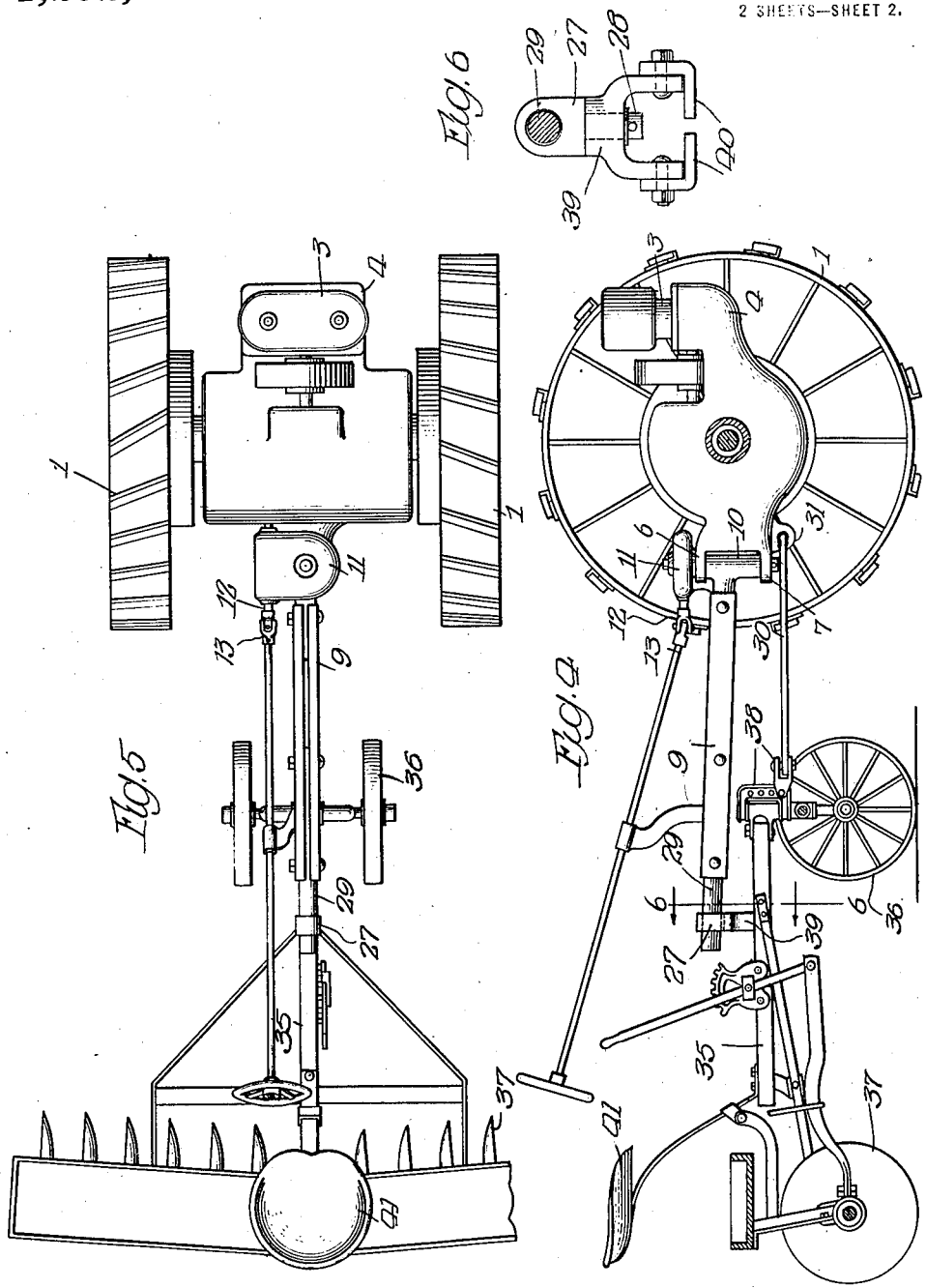

ALVARO S. KROTZ, OF JANESVILLE, WISCONSIN, ASSIGNOR TO THE JANESVILLE MACHINE COMPANY, OF JANESVILLE, WISCONSIN, A CORPORATION OF WISCONSIN.

TRACTOR.

1,292,398.  Specification of Letters Patent.  Patented Jan. 21, 1919.

Application filed August 27, 1917. Serial No. 188,270.

*To all whom it may concern:*

Be it known that I, ALVARO S. KROTZ, a citizen of the United States of America, and resident of Janesville, Wisconsin, have invented a certain new and useful Improvement in Tractors, of which the following is a specification.

My invention relates to tractors in general, but more particularly to those which have only two wheels, which are comparatively light and simple in construction, and which are adapted to be employed as a substitute for horses, in various ways, as for example, in operating agricultural implements and other devices which are ordinarily pulled by horses, and which are constructed and primarily intended for operation in that manner.

Generally stated, the object of my invention is to provide an improved and simple and comparatively light form of tractor which can be used for various purposes, and which can be employed for hauling ordinary plows or cultivators, or other agricultural implements, or even wagons or other vehicles.

A special object is to provide an improved construction and arrangement whereby, in a two-wheeled tractor of this particular character, the connection which extends from the tractor to the agricultural implement or other device, to hold the tractor upright, does not sustain the draft, but simply prevents the tractor from tilting forward or backward on its single pair of wheels, a separate draft connection being employed between the tractor and the agricultural implement or other device, whereby the tractor is flexibly connected with the frame or body of the agricultural implement or other device, in a manner to permit free relative movement of the tractor and agricultural implement or other device, in traveling over uneven ground.

It is also an object to provide certain details and features of improvement and combinations tending to increase the general efficiency and desirability of a two-wheeled tractor of this particular character.

To the foregoing and other useful ends, my invention consists in matters hereinafter set forth and claimed.

In the accompanying drawings, Figure 1 is a side elevation of a two-wheeled tractor, embodying the principles of my invention, showing the same coupled to a wheeled-plow.

Fig. 2 is a plan of the structure shown in Fig. 1.

Fig. 3 is a detail sectional view, on a larger scale, on line 3—3 in Fig. 2.

Fig. 4 is a view similar to Fig. 1, showing the tractor coupled to an ordinary disk cultivator.

Fig. 5 is a plan of the structure shown in Fig. 4, a portion of the cultivator being shown broken away, for convenience of illustration.

Fig. 6 is an enlarged detail sectional view on line 6—6 in Fig. 4.

As thus illustrated, my invention comprises a pair of traction wheels 1, mounted on a suitable axle, the latter being provided with differential gearing inclosed by the gear case 2, and said gearing being suitably connected with the engine or motor 3, so that the latter drives the wheels through the medium of the differential gearing, in a manner that will be readily understood. The gear casing and the engine support 4 can be cast together or formed in any suitable manner. The steering arrangement can be of any suitable or known character. For example, the rear side of the gear casing 2 can be provided with a bracket 5, having rearwardly extending upper and lower arms 6 and 7, to receive a vertical pivot 8, which latter is keyed to the arms 6 and 7, so that it is stationary relatively to the tractor body, which latter is formed by the gear casing 2 and the engine and engine-support 4, whereby the pivot 8 will turn with the tractor. The reach 9 has its forward end provided with a head or coupling portion 10, disposed between the arms 6 and 7, and mounted to turn on the pivot 8, so that said reach is adapted to swing laterally relatively to the tractor body. The steering gear may be of any suitable character, such as an ordinary worm gearing inclosed in the gear casing 11, mounted on top of the arm 6 and rigidly connected with the head 10 of the reach. The worm wheel, of course, is keyed to the upper end of the pivot 8, and the worm or screw is mounted on the horizontal shaft 12, which is connected by a universal joint 13 with the shaft 14, which extends rearward, an ordinary steering wheel 15 being provided on the rear end of this shaft. A bracket 16 may be provided on the reach 9, to support the shaft 14 and provide a bearing therefor. Devices of any suitable character (not shown) can be associated with the wheel 15, to control the operation of the engine.

The wheeled-plow shown in Figs. 1 and 2 comprises the usual frame 17, provided with front and rear furrow wheels 18 and 19, and the land side wheel 20, the plow-beam 21 being supported for up and down movement in the frame, and provided with a plow-bottom 22 of the usual or any suitable form. At its forward end, the plow-beam is provided with draft means 23 of the kind ordinarily provided for connecting a team of horses. The front wheel 18 is mounted on a spindle 24, carried by bearing 25 on the frame, in the usual manner, so that this wheel is adapted to be swung about a vertical axis, and ordinarily the tongue of a plow of this kind is connected to the upper end of the spindle 24, and in this way the wheel 18 is controlled by the horses to steer the wheeled-plow to the right or the left, but the draft is sustained entirely by the plow-beam, all of which is well-known and well understood.

To connect the tractor with the plow, the following arrangement is employed. An arch-like bracket 26 is secured to the frame 17, so that the bracket extends transversely of the frame, and the upper portion of this bracket is provided with an eye 27, having its stem 28 mounted to turn about a vertical axis, so that the entire eye can oscillate about this axis. The reach 9 has an adjustable extension 29 which is cylindrical and which extends loosely through the eye 27, whereby the reach 9 is supported for endwise sliding movement in said eye and for lateral swinging movement relative to the plow, and is also adapted to roll or oscillate about a longitudinal axis, so that the tractor can follow the inequalities of the ground without imposing any strain on the frame of the plow. A draft connection 30 extends from an eye 31 formed on the bottom of the bracket 5 to the draft beam 23 on the forward end of the plow beam, this connection consisting, for example, of a rod or bar loosely or swingingly supported at its opposite ends. In this way the draft is sustained entirely by the connection 30, while the reach 9 merely connects the tractor with the plow in a manner to hold the tractor upright. The upper end of the spindle 24 is connected by an arm 32 and a link 33 with the reach 9, and to this extent the reach simulates the usual or ordinary tongue by which the horses control the wheel 18 to steer the plow to the right or the left. The steering wheel 15 is within reach of the driver occupying the seat 34 at the rear of the plow, and when the tractor is turned to the right, for example, by the proper operation of the steering gear, the reach 9 swings to the right about the pivot provided by the stem 28 of the eye 27, and this lateral movement of the reach relative to the plow will turn the wheel 18 to the right, so that the plow will follow the tractor, it being understood that the rear wheel 19 is a caster wheel of the kind ordinarily employed on wheeled-plows of this general character. As the extension 29 of the reach is adjustable endwise in the main portion of the reach, by means of any suitable construction, it is possible to connect the tractor to plows or implements of different kinds, as it is possible to locate the bracket 26 either forward or backward of the position shown in the drawings, relatively to the reach, and according to the type or character of the implement.

In Figs. 4, 5 and 6, the construction of the tractor is the same as that previously shown and described, but in this case the tractor is connected to a disk cultivator of a common form or construction. Said cultivator comprises a frame 35, front wheels 36 and the disks 37, all arranged in the usual and well known manner. The draft connection 30 of the tractor leads to the draft means 38 on the forward end of the frame 35, and the reach 9 has its cylindric rear portion 29 inserted through the eye 27, but the latter is supported by a bracket 39, which is somewhat different from the one previously described. In this case, the said bracket 39 is just wide enough to embrace the frame 35, which is in the form of a beam, and is provided with detachable clips 40 for clamping it in place. The draft means 38, on a disk cultivator of this kind, are connected to turn about a vertical axis, with the front wheels 36, so that in this case the front steering wheels of the implement are controlled by the draft connection, instead of by the reach. For when the connection 30 is swung to one side, by turning of the tractor to the right or the left, this lateral movement turns the draft means 38 in the same direction, and thereby skews the front steering wheels 36 in the desired direction. The steering gear of the tractor, as in the previous case, is controlled by the driver from the seat 41, suitably mounted on the rear portion of the cultivator.

From the foregoing, it will be seen that the invention contemplates a novel and improved form of tractor, which is comparatively simple and light and which can be employed with various kinds of agricultural implements, as a substitute for horses, so that implements specially manufactured or constructed for use in connection with tractors will not be necessary. It is also possible, as will be seen, to connect the tractor to a wagon or other vehicle, or to things or devices other than agricultural implements.

With the construction shown and described, there is no strain imposed on the reach 9 except that which results from the tendency of the tractor to tilt forward when in operation; or, at other times, the tractor might tend to tilt backward, and in such case the reach 9 prevents such tilting movement. The reach 9, therefore, is only necessary to maintain the equilibrium of the tractor, and is not necessary for any other purpose. The loose connection between the rear end of the reach and the implement permits the latter to shift around in practically any direction, so that the implement and the tractor are practically independent of each other in traveling over uneven surfaces of ground, each being free to tilt sidewise without imposing any twisting or torsional strain on the reach.

What I claim as my invention is:

1. In combination with a device to be pulled or dragged over the ground, a two-wheeled tractor having motive power supported entirely by the two wheels thereof, a reach forming a connection between the tractor and said device to merely keep the tractor from tilting forward and backward, and a separate connection to sustain the draft from the tractor to said device.

2. A structure as specified in claim 1, in which means are provided whereby said reach has both endwise sliding motion and lateral swinging movement relating to said device, the reach being held against endwise displacement relatively to the tractor.

3. A structure as specified in claim 1, in which said device has a steering wheel, and means controlled by said reach to control said wheel.

4. A structure as specified in claim 1, in combination with means to control the steering of the tractor from a position on said device.

5. A structure as specified in claim 1, having swivel and sliding connection whereby said reach has three movements relatively to said device, to-wit:— (1) lateral swinging movement, (2) endwise sliding movement, and (3) an oscillating movement about a longitudinal axis.

6. A structure as specified in claim 1, having a connection whereby said tractor is free to tilt sidewise about a longitudinal axis relatively to said device.

7. A structure as specified in claim 1, in which means are provided to support said reach above said device and in which said draft connection is below said reach and connected to the front end of said device.

8. A two wheeled tractor for hauling different kinds of agricultural implements or other things which are constructed and intended to be pulled by horses, having a reach for connection to the thing to be pulled, so that the tractor will be prevented from tilting forward or backward on its single pair of wheels, means for loosely supporting the rear end of the reach to prevent any strain thereon by the implement or other thing being hauled, and a separate draft connection to couple the tractor to the draft means ordinarily provided on the forward end of any such implement or other thing.

9. A structure as specified in claim 8, in which said draft connection is lower and shorter than said reach, and in which said means have provisions whereby said reach swings sidewise about a vertical axis in rear of said draft connection.

10. A structure as specified in claim 8, in which means are provided for controlling said tractor from the seat of the implement.

11. A structure as specified in claim 1, in which said device is provided with steering means controlled by one of said connections between the device and the tractor.

12. The combination of an implement, a two-wheeled tractor, a draft connection from the tractor to the implement, a reach forming another connection extending rearward from the tractor, a guide in which the rear end portion of the reach is loosely supported to slide endwise, and means including a swivel to support the guide on the implement so that said guide may oscillate about a vertical axis, the rear end portion of the reach being supported to turn or oscillate in said guide.

13. A structure as specified in claim 12, in combination with a steering shaft extending rearwardly from the tractor, and means on said reach to support said shaft.

14. A structure as specified in claim 12, said implement having steering means at the front end thereof, controlled by the connection between the tractor and the implement.

Signed by me at Chicago, Illinois, this 20th day of August, 1917.

ALVARO S. KROTZ.

It is hereby certified that in Letters Patent No. 1,292,398, granted January 21, 1919, upon the application of Alvaro S. Krotz, of Janesville, Wisconsin, for an improvement in "Tractors," an error appears in the printed specification requiring correction as follows: Page 3, line 38, claim 2, for the word "relating" read *relatively;* and that the said Letters Patent should be read with this correction therein that the same may conform to the record of the case in the Patent Office.

Signed and sealed this 3d day of February, A. D., 1920.

[SEAL.]

M. H. COULSTON,
*Acting Commissioner of Patents.*

Cl. 180—12.